June 24, 1969  H. WERNEKE  3,451,114
MANUFACTURE OF A HIGHLY EFFICIENT ALUMINIUM RADIATOR
Filed Dec. 7, 1964
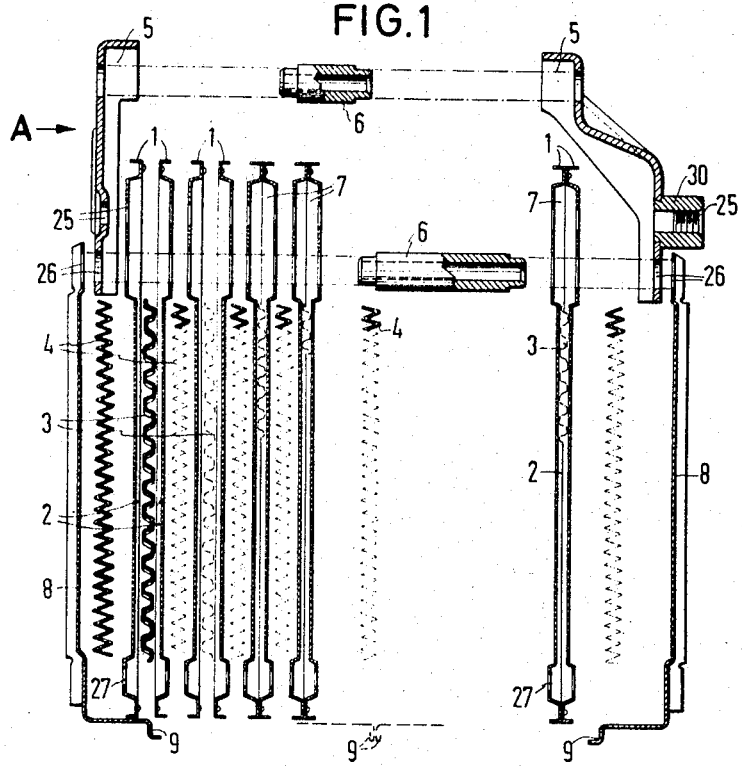
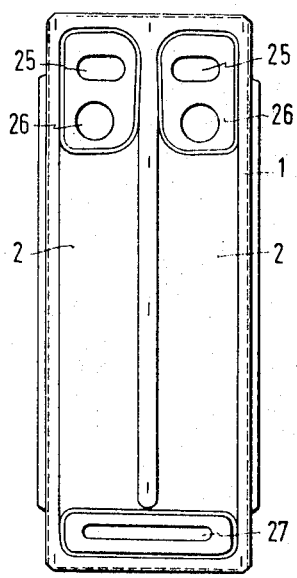
INVENTOR.
Hans Werneke
BY
Watson, Cole, Grindle & Watson
Attys.

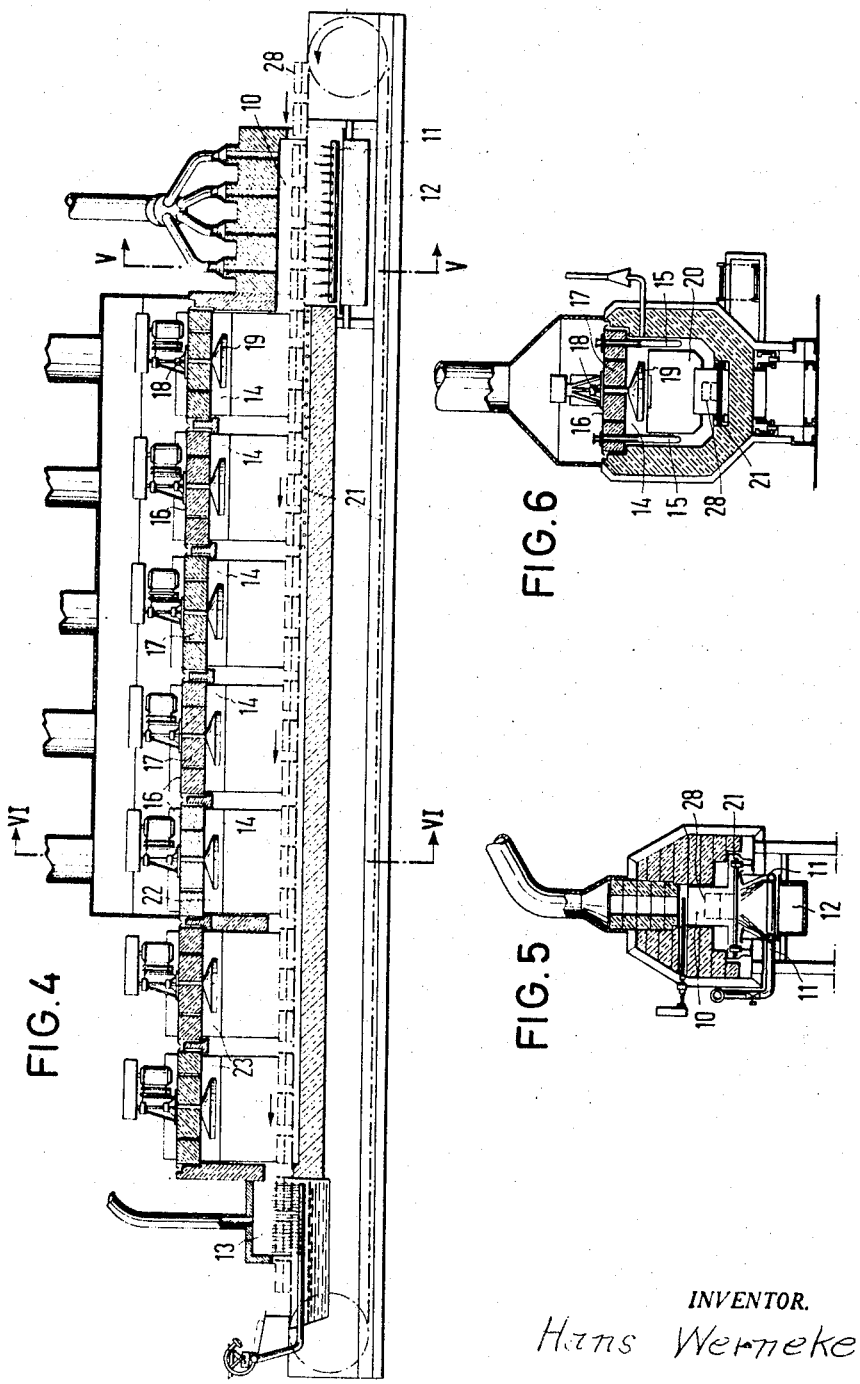

United States Patent Office 3,451,114
Patented June 24, 1969

3,451,114
MANUFACTURE OF A HIGHLY EFFICIENT ALUMINIUM RADIATOR
Hans Werneke, 14 Grabsener Landstrasse,
Marienwerder, Hannover, Germany
Filed Dec. 7, 1964, Ser. No. 416,428
Claims priority, application Germany, Dec. 10, 1963,
V 25,009
Int. Cl. B21d 53/00; B23p 15/26
U.S. Cl. 29—157.3   2 Claims

ABSTRACT OF THE DISCLOSURE

A method for manufacturing fluid oil radiators for power vehicles in which a plurality of solder plated aluminum parts are assembled into a packet sprayed with a liquid flux on the packet and centrifugally removing excess flux and heating the packet to the temperature of the solder effecting melting degree by the circulation of heated air and finally removing the flux by vaporization.

---

The present invention relates to the manufacture of a highly-efficient light-metal radiator, which is to be produced to a great extent mechanically, that is, in mass production, to obtain an article at an economical price. The manufacture of the radiators hitherto known entails too much manual labour, accessory and mechanical apparatus and material, without being very reliable, so that mass production becomes uneconomical for large series. Special clamping devices are necessary for the radiator element packets for soldering in a continuous-heating furnace, the furnace parts and fittings are subjected to too heavy wear owing to the flux, and as a result the costs for reconditioning the furnace are high. The soldering itself is inefficient, that is too slow and there are too many defects, that is rejects, so that the salt bath is generally preferred to the soldering furnace. The object of the invention is to avoid these disadvantages.

According to the invention the radiator unit is composed of separate pressed or stamped parts of solder-plated sheet aluminium forming parallel walls and the packet of superposed walls is gripped by two end walls bent inwards at right angles towards one another and welded together, while at the top they are riveted together with the end pieces forming a holding head with three fixation points as wall extension, by means of bolts passing through the packet and clamped together thereby. The packet, after being cleaned, sprayed with liquid flux which is then blown and burnt out over an open gas flame, is successively brought to soldering temperature in stages and step-by-step in a continuous-heating furnace, each chamber of which is equipped with a unit comprising ventilating and heating elements which is removable from above, and then again cooled and cleaned. The end pieces made from reinforced sheet metal and brought together to overlap at a third centrally located fixation point and held together by a sleeve, are preferably provided with inlet and outlet apertures for the finished radiator adjacent the fixation points constructed as sleeves. The assembled radiator packet is sprayed with flux internally and externally and blown also internally and externally with compressed air on a device which allows a radiator unit to be alternately fed and removed and is controlled by means of relays for maintaining constant treatment. The radiator packet is then centrifuged and again blown with compressed air. The soldering is effected in an air circulation furnace, the packets passing stepwise through a number of furnace units arranged in a row, whereby a preliminary zone is first provided in which the flux liquid is evaporated out of the radiator in that the radiator packets are conducted over gas flames passing out from simple tube bores along the path of travel and under which troughs are arranged for catching the flux.

The preliminary zone is followed by heating zones in the last of which the exact soldering temperature is maintained. These heating zones are followed by cooling zones and a spraying zone. Exchangeable ventilating and heating aggregates are provided on an exchangeable cover for each heating zone and constitute a structural unit for each heating zone. The inner side of the cover as well as the zones themselves and also the vertical heating rods hanging down from the cover are coated with fire-clay or ceramics, the heating rods being enveloped by ceramic tubes. The radiator packets are mounted on a belt and carried thereby through the furnace, that is through the individual zones, while enameled sheet steel muffles and baffle plates cause good air circulation and flow through the radiator. In order to attain an accurate soldering zone, the last heating zone is maintained at this temperature by regulating transformers. The continuous-heating furnace is charged stepwise and the radiator packets are received two at a time on devices arranged one above the other and transported by the conveyor belt. Three-piece devices of cast iron serve as support for the radiator packets with an upper part serving as clamping weight. In the spraying zone the radiator packets are quenched from 250° C. to about 20° C., after which they are boiled in water at at least 95° C. with an addition of nitric acid. They are then blown for a long time with superheated steam at 0.5 atms. and each radiator is washed by rinsing in 10 to 15 percent nitric acid at 40° C. Finally the radiator packets are blown inside and outside first by warm and then with cold air.

An embodiment of the invention is illustrated diagrammatically by way of example in the accompanying drawings and hereinafter described in detail.

FIG. 1 shows a radiator in vertical section with the parts asunder,
FIG. 2 a radiator wall in elevation,
FIG. 3 the holding head and a piece of an end wall viewed in the direction of the arrow III in FIG. 1,
FIG. 4 the continuous-heating furnace in cross-section,
FIG. 5 a section taken on line V—V of FIG. 4 and
FIG. 6 a section taken on line VI—VI of FIG. 4.

The radiator consists of a packet of plates or walls 1 composed of sheet-metal pressings soldered together. In the depressions or channels 2 of the walls or cooling rib plates 1 oil guide plates 3 are placed and soldered in position, causing distribution of the through-flowing oil and consequently intensive cooling. Apertures 25 in the walls 1 serve for the passage or the inlet and outlet of the oil, while the apertures 26 serve for receiving fixation sleeves 6 and the slots 27 for the passage of the oil. The through-flowing warm oil gives up its heat to the walls of the cooling rib plates 1, which are cooled by air supplied by a blower. To obtain a larger heat transfer surface between the individual cooling ribbed plates 1, air guide plates 4 are soldered therein which have corrugations for effecting a turbulent passage of air. On both sides of the head of the radiator thick end pieces 5 are fitted which are constructed as fixing part with fixation sleeves 6 soldered thereon. The individual parts are pressings with small tolerances and as smooth as possible. Before fitting together, all individual parts are degreased and dried after rinsing. Each two ribbed radiator plates 1 are assembled with their respective oil guide plates 3 and connected by pressing small corrugations. The radiator elements 7 produced in this manner are assembled with the air guide plates 4 on the cover plates 8 as well as with the end pieces 5 and the fixation sleeves 6, thereby forming radiator packets, and are clamped together by riveting with the fixation sleeves 6. The ends of the cover plates 8 are beaded together. Connected in this simple and necessary manner, the radiator packet is conducted through the continuous-heating furnace. Before being treated with the flux, the radiator packet is again degreased and cleaned in a steam degreasing plant. The internal and external spraying with flux is carried out in a separate device. The flux fed from a tank by a pump, is forced into a system of nozzles by which the radiator packet is sprayed inside and outside. Nozzles then blow compressed air on to the radiator internally and externally. The spraying time is controlled by a time relay. The flux residue is subsequently removed by treatment in a centrifuge. The radiator is then again blown out internally and externally with air. The actual soldering process is carried out in a circulation furnace operating on the run-through step-by-step system, the parts, particularly the solder-plated aluminium sheets being soldered together at the points where they contact. The furnace comprises a gas-heated preliminary zone 10 in which the flux liquid in and on the radiator packet is evaporated so that only small quantities of the injurious components of the flux enter the actual soldering furnace and the metal parts thereof are not attacked thereby to such a great extent. The radiator packet is preheated to about 400° C. in the preheating zone so that a constant temperature is produced in the furnace with less heating energy. The gas enters the preliminary zone 10 in the form of a flame through simple bores in the gas pipe 11 and under the gas-heated zone vessels 12 are arranged for catching the dripping flux. The preliminary zone 10 is followed by five heating zones, two cooling zones 23 and a spraying zone 13. The heating zones 14 are heated by heating rods 15 which are installed in the exchangeable covers 16. The covers 16 are lined on the underside with fire bricks 17 and the heating rods 15 protected against premature wear by ceramic heating tubes surrounding them. The drive 18 for the circulation blower as well as the ventilating fan 19 are likewise mounted on the cover 16 so that in the case of breakdowns in a heating zone the cover 16 in question can be exchanged with the circulating blower and heating rods. The temperature of the soldering zone 22 is very accurately adjustable by means of regulating transformers so that the solderings in the soldering zone 22 takes place reliably within the necessary narrow temperature range. The guiding of the air circulated by the blower is effected by enameled sheet steel muffles 20 provided with guide plates or baffles.

The transport of the radiator packets through the furnace is effected by means of a chain 21 which is controlled to move on one step every 4 minutes by means of a time relay. At the charging station of the furnace three devices 28 each carrying two radiators are placed at every step one above the other on the transport chain 21 which consequently dwells 4 minutes in each zone. These devices are made of cast iron and comprise a lower part, a middle part and an upper part without any clamping arrangement. The radiators are quenched from 250° C. to about 20° C. in the spraying zone 13 of the furnace. Thereby the flux residues crystallizing in the radiators during the cooling disintegrate into dust. These residues must be removed from the radiators. The soldered radiators are perfectly cleaned by boiling out in the washing plant with hot water with an addition of nitric acid. The final cleaning and drying as well as the testing of each radiator as regards resistance to pressure and mechanical stressing is carried out in subsequent work. The radiator is a block to be fixed on one side in cantilever fashion. Whereas the oil passages 26 in the flat end piece 5 serve as inlet and outlet for the oil, the oil passage 25 in the angular end piece 5 is in the form of an eye 30 provided with a screw thread and serves for receiving the oil pressure gauge which is then screwed into the aperture.

What is claimed is:
1. A method for the manufacture of air cooled fluid radiators particularly oil radiators for power vehicles comprising assembling a plurality of solder plated aluminum pressed parts into a packet of mechanically clamped parts, spraying a liquid flux on the packet, centrifugally removing excess flux, heating the packet of parts to the temperature of the solder effective melting degree by circulating heated air to the packet and finally removing the flux by vaporization, heating the packet after removal from a furnace with hot water at a temperature of at least 95° C. with an addition of nitric acid, and then blowing super heated steam at 0.5 atmospheres and rinsing by internal flushing in 10 to 15% nitric acid at 40° C. for 3 minutes and finally blowing externally and internally first with warm and then with cold air.

2. A method according to claim 1, in which the step is included of quenching the packets from 250° C. to approximately 20° C.

References Cited
UNITED STATES PATENTS

| | | | |
|---|---|---|---|
| 2,298,996 | 10/1942 | Woods | 29—502 X |
| 2,479,325 | 8/1949 | De Domenico | 29—502 X |
| 3,211,118 | 10/1965 | Donaldson | 113—118 |
| 2,222,721 | 11/1926 | Ramsour et al. | 113—118 X |
| 2,251,642 | 8/1941 | Tilley | 29—157.3 X |
| 2,360,123 | 10/1944 | Gerstung et al. | |
| 2,756,497 | 7/1956 | Gale | 29—495 |
| 2,867,037 | 1/1959 | Lawton | 29—496 X |
| 2,944,339 | 7/1960 | Sandberg | 29—157.3 X |
| 2,986,811 | 6/1961 | Rudd. | |

JOHN F. CAMPBELL, *Primary Examiner.*

PAUL M. COHEN, *Assistant Examiner.*

U.S. Cl. X.R.

29—471.1, 495, 496; 113—118